United States Patent [19]

Izumi et al.

[11] Patent Number: 4,772,455

[45] Date of Patent: Sep. 20, 1988

[54] FILTER

[75] Inventors: Kazuo Izumi; Kenzi Shimazaki, both of Shizuoka, Japan

[73] Assignee: Toho Belson Co., Ltd., Tokyo, Japan

[21] Appl. No.: 720,316

[22] Filed: Apr. 5, 1985

Related U.S. Application Data

[63] Continuation-in-part of Ser. No. 376,056, May 7, 1982, abandoned.

[30] Foreign Application Priority Data

Aug. 5, 1981 [JP] Japan ............................... 56-122710

[51] Int. Cl.$^4$ ...................... B01D 53/34; B01D 53/36; B01D 25/08; B01D 37/02
[52] U.S. Cl. ...................................... 423/210; 55/527; 423/230; 423/239; 423/244; 428/317.9; 428/367; 502/180; 502/417; 502/439; 502/527
[58] Field of Search ...................... 423/210, 447.1, 460, 423/230; 55/527, 528; 502/155, 180, 416, 417, 439, 527; 428/304.4, 317.9, 367, 408

[56] References Cited

U.S. PATENT DOCUMENTS 3,171,820  3/1975  Volz ....................................... 55/528
4,046,939  9/1977  Hart ....................................... 428/311
4,362,646 12/1982  Ikegami et al. .................. 423/447.2
4,366,085 12/1982  Ikegami et al. ...................... 423/210
4,464,428  8/1984  Ebert et al. ...................... 428/317.9
4,556,547 12/1985  Nishino et al. ...................... 423/230
4,565,727  1/1986  Giglia et al. ........................... 55/527

*Primary Examiner*—Robert L. Stoll
*Assistant Examiner*—Jeffrey Edwin Russel
*Attorney, Agent, or Firm*—Sughrue, Mion, Zinn, Macpeak & Seas

[57] ABSTRACT

A filter composed of a mesh structure substrate having deposited thereon and therein activated carbon fiber treated with an alkali and having a length within the range of from 5 to 1,000μ, wherein the mesh structure substrate has an average cell diameter 3 to 100 times the length of the activated carbon fiber, wherein the activated carbon fiber is adhered to the substrate by a binder, and wherein the activated carbon fiber is deposited on and in the substrate by impregnating the substrate with a dispersion obtained by dispersing activated carbon fiber in a dispersion or solution of a binder, and drying methods for forming and using the same are also disclosed.

27 Claims, No Drawings

FILTER

This is a continuation-in-part of application Ser. No. 376,056, filed May 7, 1982, now abandoned.

FIELD OF THE INVENTION

The present invention relates to a filter suitable for the removal of noxious gases, more particularly, to a filter made of a mesh structure substrate having deposited thereon given lengths of activated carbon fiber treated with an alkali.

BACKGROUND OF THE INVENTION

Various noxious gases are major environmental pollution problems. Ozone and nitrogen oxides (NOx) are the two principal oxidants produced that are responsible for air pollution. Ozone is present in the stratosphere where passenger planes fly and it is also generated by electrophotographic equipment and ozone sterilizers that use a corona discharge lamp. Excess ozone must be removed. Various effects of ozone on human health are described in "Kasseitan Kogyo" (Activated Carbon Industry), Jukagaku Kogyo Tsushin-sha Publishing Company, 1974.

Several materials have been proposed for removing noxious gases, particularly ozone in air and exhaust gas, by adsorption or decomposition, but none of them are completely satisfactory. For example, ozone removers or decomposers in the form of a catalyst of Mn, V, Fe, Cu, Ni, Cr, Co and Zn oxides or salts thereof on granular or powdery activated carbon carriers, or of a decomposition catalyst made of these elemental metals are known, but their efficiency in removing ozone is not high and they are not considered to be very good ozone removing materials. A material made of Pd or Ag supported on granular activated carbon has been proposed, but it has low ozone removing efficiency and is short-lived; furthermore, Pd or Ag are costly metals. Another type of filter comprises a container simply filled with powdery or granular activated carbon, but if the linear velocity of the gas treated is high, the powdery or granular activated carbon scatters, blows off or undergoes channelling, which causes excessive wear of the carbon and fouls the treating system.

SUMMARY OF THE INVENTION

The primary object of the present invention is to provide a filter for removing noxious gases that achieves high removal efficiency, has a long service life and which does not scatter, blow off or channel.

The filter of the present invention is composed of a mesh structure substrate having deposited thereon and therein activated carbon fiber treated with an alkali and having a length within the range of from 5 to 1,000μ, wherein the mesh structure substrate has an average cell diameter 3 to 100 times the length of the activated carbon fiber, wherein the activated carbon fiber is adhered to the substrate by a binder, and wherein the activated carbon fiber is deposited on and in the substrate by impregnating the substrate with a dispersion obtained by dispersing activated carbon fiber in a dispersion or solution of a binder, and drying.

DETAILED DESCRIPTION OF THE INVENTION

The filter of the present invention is suitable for use in removing noxious gases such as ozone, hydrogen sulfide, mercaptan, nitrogen oxides (e.g. NO and $NO_2$) and sulfide.

The filter of the present invention is suitable for use in removing a noxious gas which is present in an atmosphere in a concentration of 0.01–1000 ppm by volume. The activated carbon fibers used in the present invention preferably have a specific surface area of 500 $m^2/g$ or more as determined by the BET method, and those having a specific surface area of up to 2,000 $m^2/g$ are generally used. A value of 800 to 1500 $m^2/g$ is particularly preferred. If the specific surface area is less than 500 $m^2/g$, the activated carbon fibers are not satisfactory in removing noxious gases, and they cannot firmly support a metallic compound. If the specific surface area is more than 2,000 $m^2/g$, the activated carbon fibers are too weak to be used in practical applications.

Activated carbon fibers that are made from polyacrylonitrile fibers and which have a specific surface area as above defined generally have a porous structure wherein at least 70% of the pores have a radius structure wherein at least 70% of the pores have a radius of 100 Å or less (the minimum preferred size is 5 Å) and the pore size distribution curve is similar to that of a monodisperse system and has a large peak at a radius of about 10 Å (30% of the pores have a radius of about 10 Å).

The activated carbon fibers used in the present invention preferably have a benzene adsorption rate constant of at least 0.2/min, more preferably between 0.4 and 0.6/min. The benzene adsorption rate constant is indicated by kCo in the following formula (the Bohart and Adams formula: cf. Malcolm J. C. P. Vol. 15, No. 7, p 447 (1947) and G. S. Bohart and E. Q. Adams J. Am. Chem. Sec. Vol. 42 p 523 (1920))

$$\log [Co/C - 1] = Con - (kCot/2.303)$$

wherein
Co: the concentration of benzene in untreated gas (constant);
C: the concentration of benzene in the gas t seconds after the start of treatment;
k: rate of adsorption;
Con: a constant
t: time (in seconds)
kCo: adsorption rate constant The benzene adsorption rate constant of the activated carbon fiber is calculated from this formula on the basis of a break-through curve (showing the relation between C and time) obtained by passing nitrogen gas containing benzene (Co=100 ppm) through an activated carbon fiber bed (20 mm thick) at a rate of 10 cm/sec (25° C.).

If the benzene adsorption rate constant of the activated carbon fiber according to the present invention is less than 0.2/min, the activated carbon fiber does not have great ability to remove noxious gases whether it is used alone or in combination with a metallic compound on it. The benzene adsorption rate constant is closely related to the size, distribution and shape of the pores in the activated carbon fiber, and it also has some effect on the nature of the pores, and, logically, the activated carbon fibers having a benzene adsorption rate constant of less than 0.2/min prevent fine particles of a metallic compound from being deposited thereon uniformly, and the resultant efficiency in removal of noxious gases is low.

The activated carbon fiber used in the present invention can be made by various known methods. For example, it can be made by preoxidizing a polyacrylo nitrile fiber, cellulose fiber, pitch fiber or a phenolic resin fiber, then activating the oxidized fiber with an activation gas, e.g. steam, carbon dioxide ammonia or mixtures thereof at about 700°–1300° C. The activation gas may be used in admixture with an inert gas such as $N_2$. The concentration of the activation gas is generally at least 50 vol %, preferably between 70 and 100 vol %, and the activation period is generally from one minute to three hours. Activated carbon fibers made from polyacrylonitrile fibers are most preferred, and details of methods for preparing the same are given in British Pat. No. 1,549,759 and German Pat. No. 2,715,486. For ease of handling, the activated carbon fiber preferably has a fiber strength of at least 10 kg/mm² and a diameter of 3 to 25μ.

Common activated carbon fibers have a benzene adsorption rate constant of about 0.05 min–0.8/min or more, and this value is increased by thorough oxidation in the preoxidation step. Conventional particulate activated carbon, silica gel and activated alumina have a benzene adsorption rate constant of about 0.002/min.

The above-described activated carbon fiber is then treated with an alkaline. The alkali treatment is usually conducted with an aqueous solution of an alkali such as NaOH or KOH. The concentration of the alkali is preferably from 0.5 to 15% by weight, more preferably from 1 to 5% by weight. If the concentration exceeds 15%, the performance of adsorption lowers and mechanical strength and a specific surface area of activated carbon fiber decrease. On the other hand, if the concentration is less than 0.5 wt %, effects of the alkali treatment can not be obtained sufficiently. The temperature of the solution is not limited but it is usually from 20° to 100° C. The solution is applied to the activated carbon fiber by immersing the activated carbon fiber in the solution for about from 5 to 120 minutes. The thus treated activated carbon fiber is then washed with water, preferably, having a temperature of from 20° to 100° C. until water used for washing becomes neutral.

According to the present invention, a filter having higher efficiency in removal of noxious gases, particularly ozone, can be produced by supporting on the activated carbon fibers at least one inorganic compound or organic chelate compound of a metal of groups Ib, IIb, VIa, VIIa and VIII of the periodic table. For details of activated carbon fibers having supported thereon an organometallic chelate compound, see U.S. patent application Ser. No. 207,039, corresponding to U.S. Pat. No. 4,366,085 British Patent Application No. 8,036,641, French Patent Application 8,024,126 and German Patent Appication PNo. 3,043,022.9. Preferred metals of groups Ib, IIb, VIa, VIIa and VIII include Cu, Ag, Zn, Cd, Cr, Mn, Co, Ni, Pd and Fe. Water-soluble salts, such as the hydrochloride, sulfate and nitrate of these metals or their hydrous salts may be used as the inorganic metallic compound. Illustrative salts include $CuCl_2$, $CuSO_4$, $NiSO_4$, $NiCl_2$, $NiSO_4.6H_2O$, $Ni(NO_3)_2$, $FeCl_3$, $Fe(SO_4)_3$, $ZnCl_2$, $ZnSO_4$, $MnSO_4$, $MnCl_2.4H_2O$, $CoCl_2$, $Co(NO_3)_2.6H_2O$, $PdCl_2$, $CrCl_3$, $Cr_2(SO_4)_3.18-H_2O$, $Cr(NO_3)_3.9H_2O$ and $AgNO_3$, or mixtures thereof.

The organometallic chelate compound can be made by coordinating one of the above-mentioned metals with an organic chelating agent. Any chelating agent can be used that is capable of linking with one of the above listed metals by a coordination bond; examples are ethylene-diaminetetraacetic acid (EDTA), nitrilotriacetic acid (NTA), trans-1, 2-cyclohexadiaminetetraacetic acid (CyDTA), diethylenetriaminepentaacetic acid (DTPA), triethylenetetraaminehexaacetic acid (TTHA), glycol ether diaminetetraacetic acid (GETA), iminodiacetic acid (IDA), N,N-ethylenebis (γ,o-hydroxyphenyl)-glycine (EHPG) and other complexans. Chelate compounds can be produced by reacting a chelating agent with one of the above mentioned metallic compounds, and illustrative chelate compounds include EDTA-Ni(II), EDTA-Zn(II), DTPA-Cu(II), IDA-Ni(II), NTA-Cu(II), EDTA-Fe(III), GETA-Mn(II), EHPG-Mn(II), CyDTA-Cr(III), EDTA-Co(II), TTHA-Co(II) and EDTA-Fe(II).

The inorganic metallic compound or organometallic chelate compound is supported on the activated carbon fiber in an amount of generally from 0.01 to 30 wt %, preferably from 2 to 20 wt %, on the basis of the weight of the activated carbon fiber before the compound is supported thereon. If the amount of the metallic compound is less than 0.01 wt %, high efficiency in removal of noxious gases is not obtained, while if the amount exceeds 30 wt %, the apparent specific surface area of the activated carbon fiber is decreased and the resultant gas removal efficiency is significantly reduced.

The inorganic metallic compound is usually supported on the activated carbon fiber by immersing it in a solution of the metal salt or by spraying the activated carbon fiber with such solution. Either treatment is preferably performed at between 5° and 100° C., usually at room temperature. The solution is usually an aqueous solution of the salt(s) having a concentration of 0.01 to 10 wt %, preferably 0.1 to 1 wt %. The treated activated carbon fiber is then washed with water and dried, preferably at 50°–110° C.

The organometallic chelate compound can be deposited on the fibrous active carbon by various methods. Examples of such methods are given below:

(1) A metal chelate compound is dispersed, preferably dissolved in water or an organic medium which is liquid at ordinary temperature, has a boiling point of not more than 100° C. and is easily removed by drying. Such solvents include, for example, ketones such as acetone, alcohols such as methanol and ethanol, and benzene. The activated carbon fiber is soaked in the disperson or solution, or the dispersion or solution is attached to the activated carbon fiber by spraying and then dried. The concentration of the dispersion or solution is generally from about 0.01 wt % to about 10 wt %, preferably 0.1 to 5 wt %, and the pH of the solution is preferred to be adjusted to 4–8 using a HCl, $H_2SO_4$ or $HNO_3$ aqueous solution, if necessary. The soaking time is from about 10 minutes to about 5 hours. The soaking is preferably conducted at from about 5° C. to 100° C., usually at room temperature. After soaking, the activated carbon fiber is washed with water and then dried. Drying is carried out at a temperature below the decomposition temperature of the metal chelate compound, generally at about 200° C. or less.

(2) A solution of a chelating agent is attached to the activated carbon fiber and, thereafter, a solution of a metal salt, such as a water-soluble halide salt, sulfate, sulfite, nitrate or nitrite is attached to the activated carbon fiber. Such treatment is preferably conducted at from about 5° C. to 100° C., usually at room temperature. After treatment, the fibrous active carbon is washed with water and then dried in the same manner as in (1) to form a metal chelate compound on the activated carbon fiber. Alternatively, a solution of a metal salt may be attached on the activated carbon film firstly and then a solution of a chelating agent is attached thereon.

The concentration of the chelating agent in the solution (solvents disclosed in (1) may be used) is ordinarily from about 0.01 wt % to 10 wt %, preferably from 0.1 wt % to 1 wt %, and the concentration of the metal salt in the solution is ordinarily from about 0.01 wt % to 10 wt %, preferably from 0.1 wt % to 1 wt %, The amount of the chelating agent attached is about 1 to 2 molar equivalents per 1 molar equivalent of the metal salt. Any method such as soaking, spraying, etc., can be used for the attachment.

In any of the above described methods, the amount of metal chelate compound deposited is controlled by the concentration of the solution in which the fibrous active carbon is soaked or which is sprayed, the soaking time and the amount of the solution sprayed. Where the activated carbon fiber is soaked in a solution or dispersion, the ratio (by volume) of the activated carbon fiber to the dispersion or solution is generally from 1:10 to 1:200.

Cutting of activated carbon fiber may be conducted at any steps, that is, either before or after the alkali treatment or the treatment with a metal compound described hereinabove. However, cutting is preferably conducted after finishing such treatments. The activated carbon fiber cut to a length within the range of 5 to 1,000μ by any suitable method, e.g., grinding or crushing. If the fiber length is less than 5μ, openings in the substrate mesh are easily blocked, while if the length is greater than 1,000μ, the fibers cannot be easily deposited in the substrate. In other words, in the present invention substantially each fiber should have a length between 5 and 1,000μ. A fiber length between 30 and 100μ is particularly preferred. The desired length can be obtained by crushing a tow, felt or web of the activated carbon fibers with a crusher. The activated carbon fiber may be cut to any suitable length before the inorganic metallic compound or organometallic chelate compound is supported thereon.

One feature of the filter of the present invention is that it uses a substrate having a mesh structure. The filter is made by depositing the above described activated carbon fiber on the substrate. A mesh structure substrate having a low pressure loss is preferred. The average size of the openings (cells) thereof is greater than the fiber length, and is usually 3 to 100 times, preferably 5 to 70 times, the fiber length. If the cell size is more than 100 times the fiber length, it is difficult to deposit the desired amount of activated carbon fiber on the substrate and hence a high-performance filter is not obtained. The substrate preferably has 5 to 200 cells per 2.5 cm of the substrate. (Hereinafter, the number of cells per 2.5 cm of a substrate will be called as a cell number.)

The substrate used in the present invention is made of a porous synthetic resin having continuous open cells, such as polyurethane foam or polystyrene foam, or is formed of a woven fabric, knitted fabric, nonwoven fabric, felt or mesh of various fibers such as natural fibers, e.g., cotton, silk, wool, synthetic fibers, e.g., nylon and polyester, glass fiber and mixtures thereof. A flexible urethane foam having open cells is preferred.

In the present invention, the activated carbon fiber is deposited on both of outer and inner surfaces of the substrate. The deposition is conducted by the following method: A binder made of a natural or synthetic polymeric material such as starch pate, carboxymethyl cellulose, hydroxyethyl cellulose, polyvinyl alcohol, polyacrylic acid, polyacrylamide (water-soluble polymers), polystyrene, polyethylene, polyvinyl acetate, polyacrylonitrile or polyvinyl chloride is dissolved or dispersed in water or an organic solvent such as acetone, ethanol or benzene that is inert to the substrate, or a mixture of these solvents, preferably a water-soluble organic solvent or a mixture of one water-soluble organic solvent with another, and activated carbon fibers having a length of 5 to 1,000 μm are dispersed in the resulting solution or dispersion. The amount of the binder inthe solution or dispersion is usually from 0.3 to 30 wt %, preferably from 0.5 to 10 wt %, based on water or the organic solvent, and the amount of the activated carbon fiber is usually from 5 to 40 wt %, preferably from 20 to 30 wt %, based on water or the organic solvent. A surfactant may be added to the solution or dispersion to facilitate dispersion of the activated carbon fiber in the solution or dispersion. A cationic or nonionic surfactant such as sodium alkylsulfate, a sodium salt of a fatty acid or polyoxyethylene may be used, and such surfactant is generally used in an amount of 0.1 to 10 wt % on the basis of the solution or dispersion.

The substrate is then impregnated with the resulting dispersion and dried. Impregnation is usually effected by immersing the substrate in the dispersion. A compressible substrate such as a urethane foam is advantageous because the dispersion is absorbed by the foam simply by compressing it and letting it return to its original state (due to its resiliency) in the dispersion.

Impregnation is usually performed in such a manner that the amounts of the activated carbon fiber and binder are from 10 to 200 wt % and 0.5 to 30 wt %, respectively, on the basis of the substrate, and these respective values are preferably from 50 to 150 wt % and from 2.5 to 20 wt %, on the basis of the substrate. If the amount of the binder exceeds 30 wt %, the specific surface area of the activated carbon fiber is decreased to reduce the efficiency in removal of noxious gases.

The substrate is immersed in the dispersion usually at 5° to 100° C., preferably at 20° to 80° C., for a period of from about 5 minutes to 3 hours. The substrate is then dried, and, if an organometallic chelate compound is supported on the activated carbon fiber, the drying temperature is not higher than the decomposition point of the chelate compound and is also not higher than the softening and melting points of the substrate; a temperature of 200° C. or below is preferred.

The amount of the activated carbon fiber deposited on and in the substrate is properly determined by the specific object of using the filter of the present invention. If more than 200 wt % of the activated carbon fiber is deposited, the activated carbon fiber has a tendency to drop off the substrate or wear, or the filter has a high pressure loss.

By conducting the alkali treatment of activated carbon fiber the following improvements can be obtained.

(i) An excellent dispersability of activated carbon fiber to a dispersion of solution of a binder can be obtained. Consequently, a homogeneous dispersion of activated carbon fiber can be obtained.

(ii) The contact efficiency of a gas which is subjected to filtration, with activated carbon fiber in the filter is improved and life of the filter becomes long because the activated carbon fiber can be uniformly deposited on the surface of the substrate.

(iii) The fixing of the metal compound described hereinabove is accelerated.

The activated carbon fiber deposited on and in the substrate will not scatter or channel even if the gas treated passes through the activated carbon fiber at high rates. As another advantage, the activated carbon fiber is held in uniform contact with the gas, and the increased contact efficiency leads to a greater ability to remove noxious gases. Furthermore, the filter of the present invention exhibits minimum activated carbon wear and hence prevents fouling of the treating system. If starch paste is used as a binder, the performance of the activated carbon fiber is not reduced (i.e., its surface area is not decreased), and it will not drop off the substrate. The shape and size of the filter of the present invention can be suitably determined depending on the use thereof, and one or more filters of the same shape are advantageously superposed.

Air or exhaust gas can be freed of noxious components simply by passing the same through the filter of the present invention. The air or exhaust gas usually has a temperature of 0° to 50° C., and is fed at a linear velocity of 0.1 to 2 m/sec and a space velocity of 2,000 to 100,000 $hr^{-1}$. Ozone as a noxious gas is adsorbed on the filter and decomposed to harmless oxygen. In a similar manner, sulfite gas and hydrogen sulfide are changed to sulfuric acid and sulfur, respectively. Nitrogen monoxide is gradually converted to nitrogen dioxide and nitrogen oxide to nitrous acid.

The present invention is now described in greater detail by reference to the following examples and comparative examples which are given here for illustrative purposes only and are by no means intended to limit its scope. In the examples and comparative examples, all percents are by weight.

EXAMPLE 1

A tow (150,000 filaments) of an acrylic fiber (size of filament was 3 denier; $TiO_2$ content was 0.1% by weight) made of a copolymer comprising 92.0% acrylonitrile, 4.5% methyl acrylate and 3.5% acrylamide was oxidized in air at 240° C. for 1.5 hours and then at 270° C. for 1.5 hours at a tension to give a shrinkage of 25%. The oxidized fiber was then treated at 950° C. with a mixture of steam and nitrogen ($H_2O:N_2=4:1$ by vonume) for 3 minutes to produce an activated carbon fiber having a specific surface area of 1,100 $m^2/g$. The activated carbon fiber had a nitrogen content lf 6.0 wt %, a tensile strength of 34 $kg/mm^2$, a diameter of 10.0$\mu$ and a benzene adsorption rate constant of 0.5/min.

The thus obtained activated carbon fiber was immersed in an 2% NaOH aqueous solution at a temperature of 80° C. for 30 minutes, and then the activated carbon fiber was washed with water of 80° C. until the water used for washing became neutral. The thus obtained activated carbon fiber was ground in a crusher into particles having a length of 25$\mu$ or less and an average length of 15$\mu$. The thus obtained particles of activated carbon fiber were dispersed in water to form an aqueous dispersion containing 1% carbomethoxycellulose and 20% activated carbon fiber particle. The dispersion was once heated to 70° C., cooled to 25° C. and a urethane foam was impregnated with the dispersion at 25° C. for 5 minutes.

The dispersion was impregnated into the urethane foam by passing the urethane foam between a nip roller (comprising of two rollers) which is placed at the center of path way and rotating at a velocity of 20 m/hr in the dispersion. The time for immersion of the activated carbon fiber in the dispersion was 5 minutes. The foam had a thickness of 10 mm, 240 $g/m^2$, an average cell size of 250$\mu$ and contained 50 cells per 2.5 cm. The urethane foam was removed from the dispersion and dried at 80° C. for 40 minutes to form a filter having activated carbon fiber deposited thereon and therein in an amount of 50 wt % based on the urethane. Two such filters were piled up in a thickness of 20 mm and were placed in a glass column having an inner diameter (hereafter ID) of 28 mm and subjected to $NO_2$ adsorbing test using a $NO_2$ gas of 10 ppm (vol) in air. The linear velocity of the gas was 0.45 m/sec, the adsorption temperature was 25° C. and the realtive humidity was 65%. The efficient adsorption amount was 2.4%.

EXAMPLE 2

Activated carbon fiber obtained in Example 1 was subjected to each treatment shown in the following Table 1 to obtain Samples 1-5.

For comparison Sample 6 was prepared by forming a mat (130 $g/m^2$) using activated carbon fiber prepared in the same manner as in Example 1. In the mat the content of activated carbon fiber and rayon fiber were 100 $g/m^2$ and 30 $g/m^2$, respectively.

Samples 7 and 8 also were prepared for comparison. Granular carbon (8–10 mesh) made from coal and having a specific surface area of 1100 $m^2/g$ was subjected to an alkali treatment and then crushed by a crusher to obtain particles having a size of not more than 7$\mu$ (average diameter was 5$\mu$) the thus obtained particles were deposited on and in an urethane foam in the same manner as for Samples 1-4 to obtain Sample 7. In the same manner as for Sample 7 except that the granular carbon treated with alkali was further treated with a chelate compound to obtain Sample 8.

The amount of each activated carbon fiber or granular carbon on and in the urethane foam or in the mat was 100 $g/m^2$.

The alkali treatment was conducted by immersing activated carbon fiber or granular carbon in a 2% NaOH aqueous solution at 80° C. for 30 minutes, washing the thus treated material with water of 25° C. until water used for washing became neutral.

The treatment with a chelate compound was conducted by immersing activated carbon fiber or granular carbon in a 2.5 wt % EDTA-Zn chelate compound aqueous solution at 30° C. for 30 minutes, and then washing with water and drying to obtain activated carbon fiber or granular carbon having 1.5% by weight of the chelate compound.

The showering method was conducted by showering an aqueous dispersion containing of 5 wt % of activated carbon fiber and 0.25 wt % of carbomethoxycellulose using a nozzle hivng holes having 1 mm diameter arranged in a straight line and placed at intervals of 10 mm. The amount of applying the dispersion was controlled by changing the showering time.

Each of Samples No. 1-8 were piled up in a thickness of 10 mm and were placed in a glass column having an inner diameter of 28 mm and subjected to ozone adsorbing test using a gas containing 2 ppm of ozone in air. The test was conducted at 25° C., under a relative humidity of 65% and by passing the gas through the column in a linear velocity of 0.60 m/sec. The pressure loss at the beginning of adsorption and the ozone removal efficiency after 48 hours from the beginning were measured.

The urethane foam had open cells, a thickness of 5 mm, 120 g/m² and an average cell diameter of 300μ, and 50 cells per 2.5 cm.

The thus obtained results are shown in the following Table 1.

TABLE 1

| Sample No. | Filter Construction | Alkali Treatment | Treatment with Chelate Compound | Method for Adhering Activated Carbon Fiber or Granular Carbon to Substrate (g/m²) | Pressure Loss (mm H₂O) | Ozone Removal Efficiency (%) | Note |
|---|---|---|---|---|---|---|---|
| 1 | ACF Crushed and Urethane Foam | None | None | Impregnation | 0.5 | 79 | Comparative |
| 2 | ACF Crushed and Urethane Foam | None | Treated | " | 0.4 | 94 | " |
| 3 | ACF Crushed and Urethane Foam | Treated | None | " | 0.3 | 100 | Invention |
| 4 | ACF Crushed and Urethane Foam | " | Treated | " | 0.3 | 100 | " |
| 5 | ACF Crushed and Urethane Foam | " | " | Showering | 4.1 | 47 | Comparative |
| 6 | ACF Mat | " | " | — | 3.4 | 100 | " |
| 7 | Granular Carbon and Urethan Foam | " | None | Impregnation | 4.0 | 13 | " |
| 8 | Granular Carbon and Urethan Foam | " | Treated | " | 4.0 | 21 | " |

From the results it can be seen that the filter of the present invention provides a high ozone removal efficiency with an extremely less pressure loss. It can also be seen from the results that the granular carbon does not provide a sufficient adsorption property at such severe condition (a high linear velocity of gas). Furthermore, among methods for depositing active carbon fiber to a substrate, impregnation is much superior to showering.

While the invention has been described in detail and with reference to specific embodiments thereof, it will be apparent to one skilled in the art that various changes and modifications can be made therein without departing from the spirit and the scope thereof.

What is claimed is:

1. A filter composed of a mesh structure substrate having deposited thereon and therein activated carbon fiber obtained by activating the carbon fiber with an activation gas which activated carbon fiber is treated with an alkali and has a length within the range of from 5 to 1,000μ, wherein the mesh structure substrate has an average cell diameter 3 to 100 times the length of the activated carbon fiber, wherein the activated carbon fiber is adhered to the substrate by a binder, and wherein the activated carbon fiber is deposited on and in the substrate by impregnating the substrate with a dispersion obtained by dispersing activated carbon fiber in a dispersion or solution of a binder, and drying, wherein said treatment with an alkali is conducted by applying an aqueous solution of the alkali to the activated carbon fiber, the activated carbon fiber being washed with water after applying the aqueous solution of the alkali to the activated carbon fiber, the washing with water being conducted until the water used for the washing becomes neutral.

2. A filter according to claim 1, wherein the activated carbon fiber has a specific surface area of 500 m²/g or more.

3. A filter according to claim 1, wherein the activated carbon fiber has a specific surface area of 500 to 2,000 m²/g.

4. A filter according to claim 1, wherein the activated carbon fiber has a benzene adsorption rate constant of 0.2/mm or more.

5. A filter according to claim 1, wherein the activated carbon fiber has supported thereon at least one compound of a metal selected from groups Ib, IIb, VIa, VIIa and VIII of the Periodic Table.

6. A filter according to claim 5, wherein the activated carbon fiber has supported thereon 0.01 to 30 wt % of the metal compound based on the weight of the activated carbon fiber.

7. A filter according to claim 1, wherein the substrate has 5 to 200 cells or openings per 2.5 cm of the substrate.

8. A filter according to claim 1, wherein the substrate is a porous synthetic resin having continuous open cells.

9. A filter according to claim 1, wherein the substrate comprises a urethane foam or polystyrene foam.

10. A filter according to claim 1, wherein the substrate comprises a urethane foam.

11. A filter according to claim 1, wherein the activated carbon fiber is deposited on the substrate in an amount of from 10 to 200 wt % based on the weight of the substrate.

12. A filter according to claim 1, wherein the binder is selected from starch paste, carboxymethyl cellulose, hydroxyethyl cellulose, polyvinyl alcohol, polyacrylic acid, polyacrylamide, polystyrene, polyethylene, polyvinyl acetate, polyacrylonitrile adnm polyvinylidene chloride.

13. A filter according to claim 1, wherein the binder is used in an amount of from 0.5 to 30 wt % based on the weight of the substrate.

14. A filter according to claim 1, wherein the activated carbon fiber is derived from a polyacrylonitrile fiber.

15. A filter according to claim 1, wherein the activated carbon fiber has a diameter of 3 to 25μ.

16. A process for producing a filter comprising dispersing activated carbon fiber obtained by activating the carbon fiber with an activation gas, which activated carbon fiber is treated with an alkali and has a length within the range of 5 to 1,000μ in a dispersion or solution of a binder, impregnating the resulting dispersion in a mesh structure substrate to adhere the carbon fiber thereon and therein, and drying the impregnated substrate, wherein the mesh structure substrate has an average cell diameter 3 to 100 times the length of the activated carbon fiber and wherein the activated carbon fiber is adhered to the substrate by a binder, wherein said treatment with the alkali is conducted by applying an aqueous solution of the alkali to the activated carbon fiber, the activated carbon fiber being washed with water after applying the aqueous solution of the alkali to the activated carbon fiber, the washing with water being conducted until the water used for the washing becomes neutral.

17. A process according to claim 16, wherein said alkali is selected from the group consisting of NaOH and KOH.

18. A process according to claim 16, wherein the concentration of the aqueous solution is from 0.5 to 15% by weight.

19. A process according on claim 16, wherein the temperature of the aqueous solution is from 20° to 100° C. and the solution is applied to the activated carbon fiber by impregnating the activated carbon fiber with the aqueous solution for from 5 to 120 minutes.

20. A method for removing ozone from a gas which comprises passing the gas through a filter made of a mesh structure substrate having deposited thereon and therein activated carbon fiber obtained by activating the carbon fiber with an activation gas, which activated carbon fiber is treated with an alkali and has a length within the range of from 5 to 1,000μ, wherein the mesh structure substrate has an average cell diameter 3 to 100 times the length of the activated carbon fiber and wherein the activated carbon fiber is adhered to the substrate by a binder, wherein said treatment with an alkali is conducted by applying an aqueous solution of the alkali to the activated carbon fiber, the activated carbon fiber being washed with water after applying the aqueous solution of the alkali to the activated carbon fiber, the washing with water being conducted until the water used for the washing becomes neutral.

21. A filter according to claim 1 wherein the activation gas is selected from the group consisting of steam, $CO_2$, $NH_3$, a mixture thereof or a member from said group containing an inert gas.

22. The process of claim 16, wherein said activation gas is selected from the group consisting of steam, $CO_2$, $NH_3$, a mixture thereof or a member from said group containing an inert gas.

23. A method according to claim 20, wherein said activation gas is selected from the group consisting of steam, $CO_2$, $NH_3$, a mixture or a member from said group containing an inert gas.

24. A filter according to claim 1 wherein the activation gas is selected from the group consisting of steam, $CO_2$, $NH_3$, a mixture thereof or a member from said group containing an inert gas and wherein the activated carbon fiber is derived from a polyacrylonitrile fiber.

25. The process of claim 16, wherein said activation gas is selected from the group consisting of steam, $CO_2$, $NH_3$, a mixture thereof or a member from said group containing an inert gas and wherein the activated carbon fiber is derived from a polyacrylonitrile fiber.

26. A method according to claim 20, wherein said activation gas is selected from the group consisting of steam, $CO_2$, $NH_3$, a mixture or a member from said group containing an inert gas and wherein the activated carbon fiber is derived from a polyacrylonitrile fiber.

27. A method for removing hydrogen sulfide from a gas which comprises passing the gas through a filter made of a mesh structure substrate having deposited thereon and therein activated carbon fiber obtained by the process consisting of activating the carbon fiber with an activation gas, which activated carbon fiber is treated with an alkali and has a length within the range of from 5 to 1,000μ, wherein the mesh structure substrate has an average cell diameter 3 to 100 times the length of the activated carbon fiber and wherein the activated carbon fiber is adhered to the substrate by a binder, wherein said treatment with an alkali is conducted by applying an aqueous solution of the alkali to the activated carbon fiber, wherein the activated carbon fiber is washed with water after applying the aqueous solution of the alkali to the activated carbon fiber, the washing with water being conducted until the water used for the washing becomes neutral.

* * * * *